United States Patent
Van De Graaf

(10) Patent No.: US 6,567,658 B1
(45) Date of Patent: May 20, 2003

(54) ANNOUNCING ADVERTISEMENTS TO USERS OF A TELECOMMUNICATIONS SYSTEM

(75) Inventor: Willem Van De Graaf, Nieuwendijk (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/582,311

(22) PCT Filed: Dec. 24, 1998

(86) PCT No.: PCT/EP98/08574
§ 371 (c)(1),
(2), (4) Date: Sep. 1, 2000

(87) PCT Pub. No.: WO99/34586
PCT Pub. Date: Jul. 8, 1999

(30) Foreign Application Priority Data

Dec. 24, 1997 (EP) .............................................. 97204104

(51) Int. Cl.[7] .......................... H04M 11/00; H04M 15/06

(52) U.S. Cl. ........................ 455/412; 455/552; 379/112; 379/63

(58) Field of Search ............................ 705/14; 455/414, 455/517, 422, 550, 412, 552; 379/112, 114, 115, 72, 67, 88, 89, 87, 84, 96; 340/539

(56) References Cited

U.S. PATENT DOCUMENTS

| | | | |
|---|---|---|---|
| 5,448,625 A | | 9/1995 | Lederman |
| 5,469,496 A | * | 11/1995 | Emery et al. ................ 455/461 |
| 5,504,804 A | * | 4/1996 | Widmark et al. ............ 455/414 |
| 5,528,672 A | | 6/1996 | Wert |
| 5,579,379 A | * | 11/1996 | D'Amico et al. ....... 379/114.01 |
| 5,664,948 A | | 9/1997 | Dimitriadis et al. |
| 5,729,197 A | * | 3/1998 | Cash ........................... 340/539 |
| 5,889,852 A | * | 3/1999 | Rosecrans et al. ...... 379/355.05 |
| 5,946,664 A | * | 8/1999 | Ebisawa ....................... 705/14 |

FOREIGN PATENT DOCUMENTS

| | | |
|---|---|---|
| DE | 196 35 610 | 3/1998 |
| EP | 0 797 368 | 9/1997 |
| JP | 09055783 | 2/1997 |

* cited by examiner

*Primary Examiner*—Nguyen T. Vo
*Assistant Examiner*—Kamran Afshar

(57) ABSTRACT

A method of and equipment for announcing advertisements to users of a telecommunications system wherein at least one advertisement is stored in electrical form in storage means of communication equipment of a user of the telecommunications system. The or each advertisement is announced to the user from the storage means in aural and/or visual form through loudspeaker and/or display means. The or each announcement is stored from the telecommunications system, advantageously during "off-peak" hours, and is regularly refreshed. The or each advertisement may be announced under control of the telecommunications system or autonomously by the communication equipment of the user.

17 Claims, 2 Drawing Sheets

ANNOUNCING ADVERTISEMENTS TO USERS OF A TELECOMMUNICATIONS SYSTEM

FIELD OF THE INVENTION

The present invention relates to telecommunication systems and, more specifically, to a telecommunications system wherein advertisements are announced to a user through communication equipment for use with such telecommunications system.

BACKGROUND OF THE INVENTION

Operators of telecommunication networks may offer a service by which advertisements are transmitted to users or subscribers of the telecommunications network, offering in return a lower call charging rate or lower subscription fees, for example.

The advertisements are selected from an advertisement database and are transmitted through the telecommunications system to wired or wireless communication equipment of a user or subscriber of the telecommunications system. The advertisements can be announced in aural or visual form, for example. A service of this type is disclosed in U.S. Pat. No. 4,850,007.

Each time an advertisement has to be transmitted to a user, network resources are occupied for selecting the advertisement from the advertisement database and for transmitting same to the subscriber equipment.

European patent application 0 797 368 discloses a radio telecommunications system to provide regional information, such as disaster information, advertisement information and shopping information to users connected to the radio telecommunications system within a particular region or cell. By operating a so-called information storage switch, the radio telecommunications system, i.e. the radio base station providing service to the portable telecommunication terminal of a user, to transmit its regional information which is stored in storage means of the portable telecommunication terminal.

Advertisement information is provided each time and during each time of the day at which a particular user operates the information storage switch of his portable telecommunication terminal, including busy hours.

Those skilled in the art will appreciate that this type of operations increases the communication traffic load of the telecommunications system which, in particular, is a disadvantage during peak or busy-hours of the system.

Non-prepublished DE 196 35 610 and Patent Abstracts of Japan Vol. 097, No. 006 & JP 09 055783 both disclose a telephone card having stored advertisements for use with a telephone set comprising a card reader device. Once inserted, the advertisements stored on the card will be transferred to storage means of the telephone set and displayed or announced therefrom.

Although no network resources are occupied for announcing advertisements, as disclosed above, it will be appreciated that this system lacks the possibility of announcing advertisements which are up to date, such as advertisements regarding special offers, discounts, etc. which are only valid during a limited period. Once the user buys a new telephone card, new advertisements can be announced.

SUMMARY OF THE INVENTION

Accordingly, it is an object of the present invention to provide network operators a competitive and flexible tool for offering an advertisement service.

This and other objects and advantages of the present invention are provided by a method of announcing advertisements to a user of a telecommunications system, said user having communication equipment comprising storage means for storing at least one advertisement in electrical form, and wherein the or each advertisement is announced to said user from said storage means in aural and/or visual form, characterized in that the or each advertisement is stored in said storage means of said communication equipment by said telecommunications system during off-peak hours of said telecommunications system.

Following the method according to the invention, advertisements may be stored in the storage means of the communication equipment by the telecommunications system. This provides the possibility of having the advertisements periodically refreshed, and in that advertisements relating to topical matter can be stored and announced, such as special discounts, special offers, etc. By storing the advertisements in the user equipment, network resources are only occupied once during the storage of the advertisement data and during off-peak or off-busy hours. Thereby providing network operators a tool for making the system network overcapacity more productive, which can be competitively used for providing a competitive advertisement service.

The advertisements can be announced autonomously by the communication equipment of the user and/or under the control of the telecommunications system. With regard to the latter, the network resources and load for controlling the announcement of advertisements are very minor compared to network resources for retrieval and transmission of advertisements from a network advertisements database. Announcement of advertisements can be controlled through appropriate signalling means, for example.

In a yet further embodiment of the method according the invention, the advertisements may be announced during a call to one or both the calling and called party.

Further, according to the invention, the advertisements can be selectively announced dependent on the type of call. That is, the type of advertisement, i.e. its content, may be adapted to the type of call. Further, announcement of advertisements can be blocked, for example. The type of call can be distinguished, among others, from the user or subscriber number of the called party.

By announcing advertisements at the start and the end of a call, at such time when there are no network resources involved, with the method according to the invention, a very cost-effective service is provided.

Announcement of advertisements, according to another embodiment of the invention, may be preceded, by an appropriate signalling, such as a spoken or other aural and/or visual indication.

The invention provides also communication equipment, comprising transceiver means, control means and means for information exchange, operatively connected for exchanging calls in a telecommunications system, and having storage and retrieval means, for storage and retrieval of data associated with advertisements to be announced to a user of said equipment, characterized in that said storage and retrieval means are operatively connected to said transceiver means, for storage of data associated with advertisements received from said telecommunications system.

The communication equipment may be adapted for wired and/or wireless communication, such as wired and/or wireless telephones, or data equipment like a PC-workstation adapted for exchanging calls.

According to the invention, advertisements may be exchanged in aural and/or visual form through a microphone and loudspeaker arrangement and a display of the communication equipment, if applicable.

The storage and retrieval means, according to the invention, can be arranged for storage of advertisements either or both through the telecommunications system and suitable interface means for external storage. For use with telecommunication equipment, the storage means arranged according to the invention may be provided as a separate component or unit and/or provided on the Subscriber Identity Module (SIM) card, which is generally used with mobile telephone equipment.

A network operator may offer, in return to the announcement of advertisements, reduced call charging rates and/or reduced subscription fees upto free calling. Suitable arrangements in the telecommunications system can be provided by suitable programming of the communication exchange and switching equipment, such as Service Control Point (SCP) and Service Switching Point (SSP) equipment of modern Intelligent Network (IN) telecommunications systems like the Public Switched Telephone Network (PSTN) or the Integrated Services Digital Network (ISDN) and wireless telecommunications systems, such as operating under the Global System for Mobile communications (GSM) standard or any other wireless communication technology available.

Accordingly, the invention provides also a telecommunications system, comprising switching means and wired and/or wireless transmission means for establishing transmission links with wired and/or wireless communication equipment having storage and retrieval means for storage and retrieval of data associated with advertisements to be announced to a user of said communication equipment, characterized in that said telecommunications system is arranged for transmitting data associated with advertisements to be announced for storage in said storage means of said communication equipment during "off-peak" hours of said communications system.

Further, means may be provided for announcing advertisements from the storage means of the user communication equipment, under the control of the telecommunications system.

The invention is described in more detail in the following description, with reference to the enclosed drawing.

THE DESCRIPTION OF THE EMBODIMENTS

Figure 1:
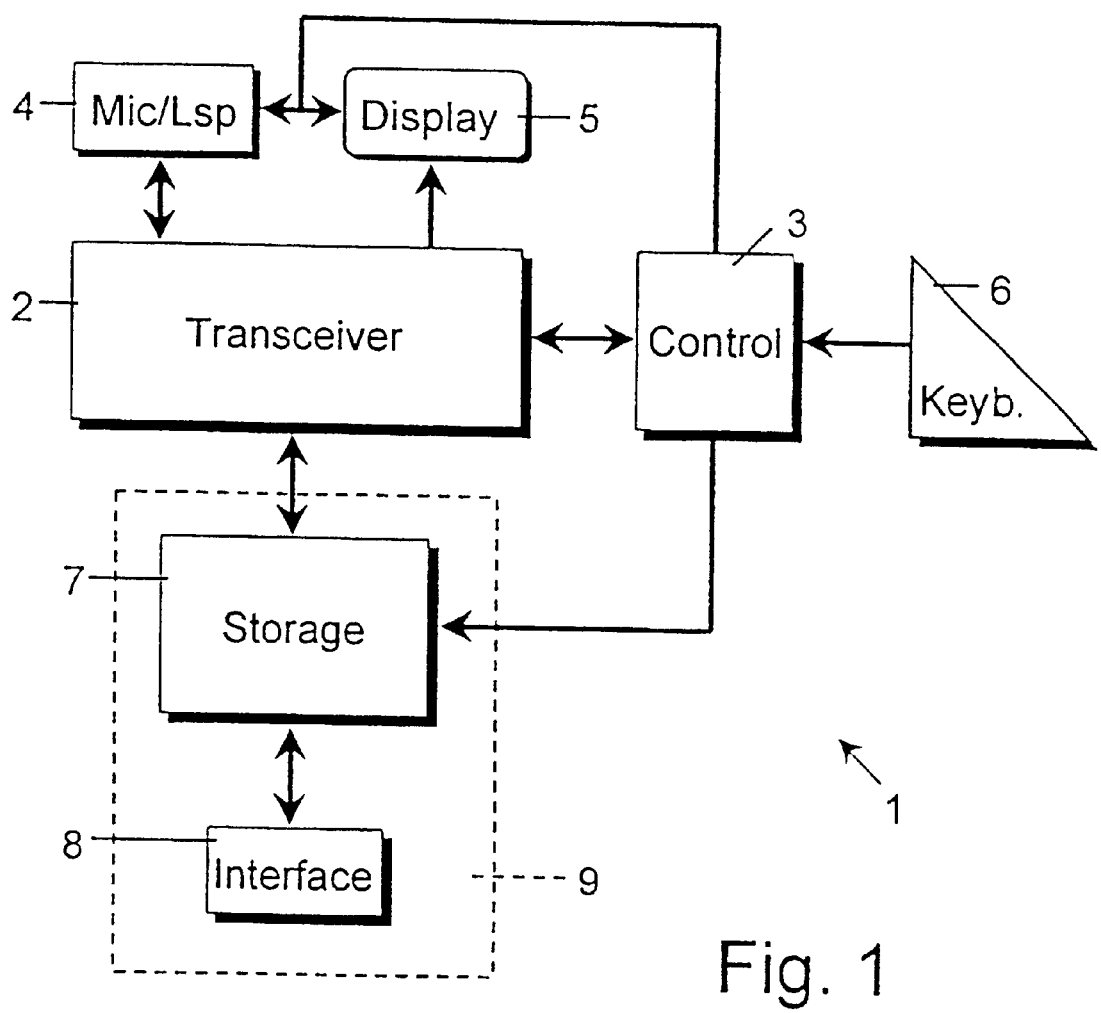
FIG. 1 shows a simplified block diagram of a telecommunications device arranged in accordance with the present invention.

FIG. 1 shows a telecommunications device or equipment 1 in accordance with the present invention, comprising operatively connected transceiver means 2 and control means 3. Information is exchanged through either or both a microphone/loudspeaker arrangement 4 and a display 5, which operatively connect to the transceiver means 2 and are controlled by the control means 3.

Reference numeral 6 designates keyboard means, such as a standard telephone keyboard or a computer keyboard, what ever appropriate.

In accordance with the invention, storage and retrieval means 7 connect to the transceiver means 2 for storage and retrieval of data associated with advertisements to be announced to a user of the device 1. The storage and retrieval means 7 connect for control purposes to the control means 3.

The communication device 1 may be arranged as a wired or wireless telephone or a personal computer supporting communications services. In the case of a wireless telecommunications device, the transceiver means 2 comprise suitable RF-transmission means, whereas in the case of a wired telephone the transceiver means are arranged for transmission of information through a drop line of a wired telecommunications system.

In accordance with the invention, the storage and retrieval means 7 are arranged for announcing advertisements to the user of the telecommunications device 1, using the microphone/loudspeaker arrangement 4 and/or the display 5. Announcement of the advertisements is controlled through the control means 3. However, separate control means may be provided (not shown).

The advertisements can be announced independent whether a call is in progress or not. Advertisements may be preceded by a suitable signalling such as a tone or other aural or visual indication.

Following the invention, advertisements are stored in the storage and retrieval means 7 via the telecommunications system, i.e. the transceiver means 2 connecting to the storage and retrieval means 7. The interface means 8 are optional and can be arranged for data exchange through a Personal Computer (PC), a data network like the Internet etc.

The control means 3 or any additional control means (not shown) can be arranged for announcement of a call dependent on the called party. For example by analysing the extension number of the called party. Further, advertisements may be announced at a particular time of the day through suitable timing means (not shown). Following the method according to the invention, advertisements may be announced to both the called and calling party by appropriate control of the transceiver means 2 etc.

As indicated by broken lines, the storage means 7 and the optional interface 8 may be provided as a separate unit 9 for use with a communication device in accordance with the present invention. The storage means 7 may also be arranged on or in the Subscriber Identity Module (SIM) card, as used with mobile telecommunication equipment.

Figure 2:
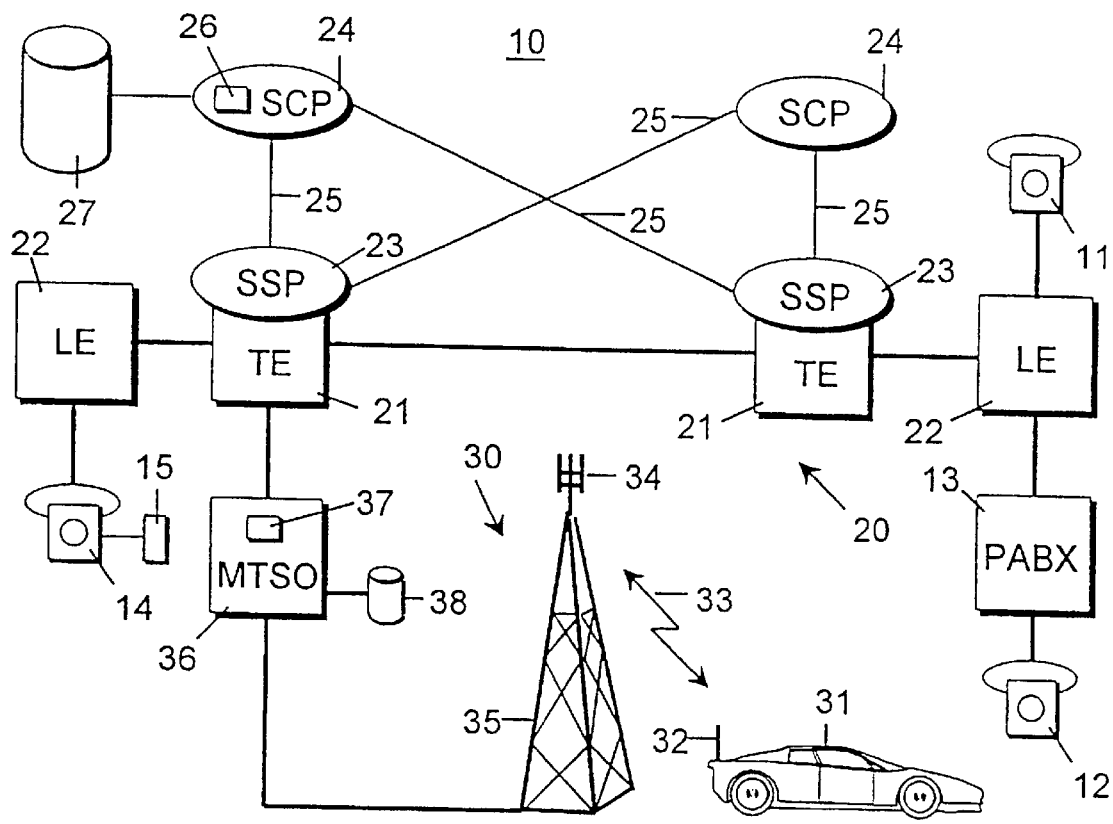
FIG. 2 shows a simplified block diagram of a telecommunications system providing wired and/or wireless telecommunications services, arranged for storage of data associated with advertisements in storage means of user communication equipment.

FIG. 2 shows a so-called Intelligent Network (IN) telecommunications system 10 comprising a wired telecommunication network 20, such as the Public Switched Telephone Network (PSTN) or the Integrated Services Digital Network (ISDN), and a wireless telecommunications network 30, such as the Global System for Mobile communication (GSM) radio network. For clarification purposes, just a single wireless telecommunications network is shown. In practice, several wireless communication networks operated by different operators can be provided, among others also a local wireless telecommunications system, such as a system operating in accordance with the Cordless Telecommunication Mobility (CTM) standard.

In the wired telecommunications system 20, users 11, 12 and 14 connect by a Local Exchange (LE) 22 to a Trunk Exchange (TE) 21. The TE 21 connect through trunk transmission links in order to exchange high traffic volumes. The users 11 and 14 connect directly to the corresponding LE 22. User 12 connects to its LE 22 via an intermediate Private Automatic Branche exchange (PABX) 13.

According to the IN concept, the TE 21 are of the type comprising Service Switching Point (SSP) equipment 23.

The SSP 23 control their associated TE in order to establish transmission links between the users 11, 12, 14 of the wired telecommunications network 20. The SSP 23 may be arranged for billing of transmission links and calls.

Each SSP 23 connects by signalling links 25 to service Control Point (SCP) equipment 24. The SCP control services available to the users of the network. IN telecommunication networks of this type are generally known to those skilled in the art.

The wireless telecommunications network 30 comprises mobile users 31, illustratively depicted in the form of a car. By means of a radio link 33 the user 31 connects by his telecommunications equipment 32 with transceiver means 34 of a radio base station 35. In practice, a wireless telecommunications network 30, such as operating in accordance with the GSM standard, comprises a plurality of radio base stations 35, each providing service to a specific geographic region, called a cell.

The radio base stations 35 connect by a Mobile Telephone Switching Office (MTSO) 36 to a TE 21. Through this connection, communication can be established between a user of the fixed or wired network 20 and users of the wireless network 30.

As schematically indicated in FIG. 2, user 14 is provided with storage means 15 for storing data relating to advertisements. The user 31 may be provided with communication equipment 1, as shown in FIG. 1, wherein the transceiver means 2 are arranged as radio transceiver means.

In the embodiment shown, both the wired telecommunications network 20 and the wireless telecommunications network 30 are provided with means for storing advertisements in the storage means 15 and 7. In the wired network, an advertisement data base 27 and control means 26 are provided, for transmitting advertisement data to the user 14, i.e. its storage means 15 and/or the user 31. The wireless telecommunication network 30 is provided with data base means 38 for advertisement data and control means 37 for storing advertisement data from the data base 38 in the storage means 7, 15 of the user equipment.

Those skilled in the art will appreciate that it is not a prerequisite that both networks are provided with advertisement data base means and appropriate control means.

The control means 26, 37 may be arranged for transmitting advertisement data during off-peak hours, for controlling the announcement of advertisements from the storage means 7, 15 of the user equipment 1, 14 during particular events, such as the start and the end of a call, during a particular time of the day etc. Such, as discussed above.

Those skilled in the art will appreciate that the telecommunications device 1 and the telecommunications systems 10 may be build from components known and commercially available without applying any additional inventive skills.

What is claimed is:

1. A method of announcing advertisements to a user of a telecommunications system, said user having communication equipment comprising storage means for storing at least one advertisement in electrical form, the method comprising the steps of:
    announcing an advertisement to said user from said storage means in aural and/or visual form; and
    storing the advertisement in said storage means of said communication equipment by said telecommunications system during off-peak hours of said telecommunications system wherein said step of storing said advertisement is performed prior to said step of announcing said advertisement to said user.

2. A method according to claim 1, further comprising the step of:
    regularly refreshed the advertisement.

3. A method according to claim 1, wherein the advertisement is announced under control of the telecommunications system.

4. A method according to claim 1, wherein the advertisement is autonomously announced by said communication equipment of said user.

5. A method according to claim 1, wherein during a call one or a plurality of advertisements is announced to one or both the calling and called party.

6. A method according to claim 1, wherein an advertisement is selectively announced dependent on the type of call.

7. A method according to claim 1, wherein at least one advertisement is announced at the start or the end of a call, not involving any network resources.

8. A method according to claim 1, wherein announcement of an advertisement is preceded by an appropriate signaling.

9. Communication equipment, comprising:
    transceiver means;
    control means; and
    means for information exchange, operatively connected for exchanging call in a telecommunications system, and having storage and retrieval means for storage and retrieval of data associated with advertisements to be announced to a user of said equipment,
    wherein said storage and retrieval means are connected to said transceiver means for storage of data associated with advertisements received from said telecommunications system during off-peak hours of said telecommunications system.

10. Communication equipment according to claim 9, wherein said control means are arranged for retrieval of data from said storage and retrieval means under the control of said telecommunications system, for one or both aural and visual announcement through said means for information exchange.

11. Communication equipment according to claim 9, wherein said control means autonomously retrieves data from said storage and retrieval means for aural or visual announcement through said means information exchange.

12. Communication equipment according to claim 9, further comprising:
    interface means for external storage in said storage and retrieval means of data associated with advertisements.

13. Communication equipment according to claim 9, wherein the data associated with advertisements is stored in a Subscriber Identity Module (SIM) card.

14. A telecommunications system, comprising:
    switching means; and
    wired and/or wireless transmission means for establishing transmission links with wired and/or wireless communication equipment having storage and retrieval means for storage and retrieval of data associated with advertisements to be announced to a user of said communication equipment,
    wherein said telecommunications system transmits data associated with advertisements to be announced for storage in said storage means of said communication equipment during off-peak hours of said communications system.

15. A telecommunications system according to claim 14, further comprising:
    means for announcing advertisements from said storage means of said communication equipment, controlled by said telecommunications system.

16. A telecommunications system according to claim 14, wherein said switching means comprise or form part of an Intelligent Network (IN) comprising Service Switching Point (SSP) equipment and service Control Point (SCP) equipment.

17. A telecommunications system according to claim 14, comprising:

wireless transmission and switching equipment operating under the Global System for Mobile communication (GSM) standard.

* * * * *